US008183850B2

(12) United States Patent
Jones et al.

(10) Patent No.: US 8,183,850 B2
(45) Date of Patent: May 22, 2012

(54) POWER CONVERTING DEVICE AND POWER SUPPLY APPARATUS

(75) Inventors: Rodney Jones, Stoke on Trent (GB); Philip Perry Waite, Maer Hills (GB)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 12/999,652

(22) PCT Filed: Oct. 16, 2009

(86) PCT No.: PCT/EP2009/063541
§ 371 (c)(1),
(2), (4) Date: Dec. 17, 2010

(87) PCT Pub. No.: WO2010/127722
PCT Pub. Date: Nov. 11, 2010

(65) Prior Publication Data
US 2011/0109298 A1    May 12, 2011

Related U.S. Application Data

(60) Provisional application No. 61/176,274, filed on May 7, 2009.

(51) Int. Cl.
*H01F 30/12*    (2006.01)

(52) U.S. Cl. ........................... 323/361; 363/5

(58) Field of Classification Search ............... 323/328, 323/332, 336, 361; 363/5, 64, 65, 93, 153, 363/171
See application file for complete search history.

(56) References Cited

U.S. PATENT DOCUMENTS

| 5,852,554 | A | 12/1998 | Yamamoto |
| 2007/0013358 | A1* | 1/2007 | Schrom et al. ............ 323/361 |
| 2007/0236969 | A1* | 10/2007 | Cottingham ............... 363/39 |
| 2008/0074911 | A1* | 3/2008 | Petter ........................ 363/65 |
| 2008/0218150 | A1* | 9/2008 | Meynard et al. .......... 323/361 |

FOREIGN PATENT DOCUMENTS

| WO | WO 9323913 A1 | 11/1993 |
| WO | WO 2008030919 A2 | 3/2008 |

* cited by examiner

*Primary Examiner* — Gary L Laxton
*Assistant Examiner* — Gustavo Rosario Benitez (57) ABSTRACT

Each voltage converting unit outputs a first signal at a first output and second signal at a second output. Each first transforming unit includes a magnetically coupled primary and secondary coil, the first output of each one of the converting units is connected to a primary coil of a different one of the first transforming units, the primary coil of each one of the first transforming units is electrically connected to one secondary coil of another one of the first transforming units. Each second transforming units includes a magnetically coupled primary and a secondary coil, the second output of each one of the voltage converting units is connected to a primary coil of a different one of the second transforming units, the primary coil of each one of the second transforming units is electrically connected to one secondary coil of another one of the second transforming units.

16 Claims, 4 Drawing Sheets

POWER CONVERTING DEVICE AND POWER SUPPLY APPARATUS

CROSS REFERENCE TO RELATED APPLICATIONS

This application is the US National Stage of International Application No. PCT/EP2009/063541, filed Oct. 16, 2009 and claims the benefit thereof. The International Application claims the benefits of U.S. provisional application No. 61/176,274 filed May 7, 2009. All of the applications are incorporated by reference herein in their entirety.

FIELD OF INVENTION

The invention relates to a power converting device.
Further, the invention relates to a power supply apparatus.

BACKGROUND OF INVENTION

Power converting devices are used in power generation for adapting, particularly matching the variable voltage, variable frequency and changing power characteristics of the generating device to the generally fixed frequency and fixed voltage characteristics of the power network or grid.

Conventionally, a power converting device comprises at least one voltage converting unit which is adapted to convert AC voltage signals of different phases to DC voltage signals of different phases or vice versa. Further, the power converting device comprises at least one inter-phase transforming unit which is adapted to operate on the voltage signal of the power converting unit. Common nodes are used for combining transformed voltage signals outputted by the inter-phase transforming units. In the use of the inter-phase transforming units, each of the typically three phases of the total power converting device themselves each have sub-phases that are combined with the inter-phase transforming system.

U.S. Pat. No. 5,852,554 discloses a power inverter comprising first, second, and third power inverting units and first, second, and third inter-phase reactors. The power inverting units are arranged and constructed to be adapted to be driven in parallel. Each of the inverting unit outputs first, second, and third voltage signals with the phases of the first, second, and third voltage signals of one of the inverting units being different to one another and with first, second, and third voltage signals of different inverting units being identical to one another, respectively. Each of the inter-phase reactors is adapted to operate on the voltage signals of identical phases and comprises three inter-phase transforming units, namely three coils. Each of the coils of one of the inter-phase reactors is electrically connected to one different output of the power inverting unit. The transformed first, second, and third voltage signals of identical phases are combined such that first, second, and third output voltage signals are generated. The combination of three voltage sources for a given phase results in a single phase output voltage that is directed at the load which may be a generator or a network, respectively.

WO 2008/030919 A2 discloses a multiphase converter which comprises first, second, and third switching cells being in parallel electrical connection to one another. Each of the switching cells is adapted to output a voltage signal of a different phase. Each of these first, second, and third voltage signals of different phases are fed to one different of first, second, and third transformers. Each of the first, second, and third transformers comprises two coils being magnetically coupled to one another. Transformed first, second, and third voltage signals output by the first, second, and third transformers are averaged and fed to a common node such that an output voltage signal of a single phase is generated. This is repeated for each of the typically three phases in the complete power converting device.

SUMMARY OF INVENTION

However, the known power converting devices suffer from a very complex constructive design.

Therefore, it is an object of the invention to provide a power converting device and a power supply apparatus comprising a power converting device, wherein the power converting device and the power supply apparatus offer improved constructive designs.

In order to achieve the object defined above, a power converting device and a power supply unit are provided.

According to an exemplary aspect of the invention power converting device is provided which comprises a plurality of N voltage converting units each comprising two outputs, wherein each voltage converting unit is adapted to output a first voltage signal of a first phase at the first output, and a second voltage signal of a second phase at the second output. Furthermore, the power converting device further comprises a plurality of N first inter-phase transforming units, each comprising a primary coil and a secondary coil which are magnetically coupled, wherein the first output of each one of the plurality of N converting units is connected to a primary coil of a different one of the plurality of first inter-phase transforming units, wherein the primary coil of each one of the plurality of first inter-phase transforming units is electrically connected to one secondary coil of another one of the plurality of N first inter-phase transforming units. Moreover, the power converting device further comprises a plurality of N second inter-phase transforming units, each comprising a primary coil and a secondary coil which are magnetically coupled, wherein the second output of each one of the plurality of N voltage converting units is connected to a primary coil of a different one of the plurality of N second inter-phase transforming units, wherein the primary coil of each one of the plurality of second inter-phase transforming units is electrically connected to one secondary coil of another one of the plurality of N second inter-phase transforming units, wherein the plurality of N first inter-phase transforming units and the plurality of N second inter-phase transforming units are grouped in N sets of inter phase transforming units each comprising one of the N first inter-phase transforming units and one of the N second inter-phase transforming units, wherein each of the N sets of inter-phase transforming units are combined in one modular unit.

In particular, the first phases of the first voltage signals may be identical. Alternatively, the fundamental voltage and phase may be identical, but the phase of the harmonic voltages of each voltage converting unit may be different (by 360 degrees/number of voltage converting units) so the combination may result in a zero emission at the basic PWM frequency. This, alternative may be achieved when phase shifted pulse width modulation patterns are applied to each voltage converting unit with respect to another, e.g. with the purpose of achieving a higher effective switching frequency at the commoning node. For example, when using 4 parallel voltage converting units, each with a PWM frequency of 2.5 kHz, but time offset by 100 microseconds from each other, may result in a switching frequency measured at the communing node of 10 kHz. Furthermore, each of the modular units may form one manufacturable unit arranged on a common carrier, board or support. In particular, the first phase and the second phase may be different from each other, e.g. the second phase may have a phase difference of 120° or −120° with respect to the first phase.

According to another exemplary aspect, a power supply apparatus to be connectable to a power supply network comprises a power generating device for generating a voltage signal and a power converting device according to an exemplary aspect.

The term "inter-phase transforming unit" may particularly denote any transforming unit which is adapted to e.g. transform a voltage signal from a first level to a second level. In particular, a first level may be a high voltage level, and a second level may be a low voltage level, with the denomination "first" and "second" being mutually exchangeable. In particular, the term "inter-phase transforming unit" may be identically used to the terms "inter-phase reactor", "inter-bridge transforming unit" and/or "interbridge reactor", with the terms "inter-phase" and "interbridge" possibly being abbreviated by "IPT" and "IBT", respectively. In particular, an inter-phase transforming unit may comprise a transformer.

The terms "primary coil" and "secondary coil" may particularly denote a "first coil" and a "second coil", respectively.

According to the exemplary aspects, a power converting device may be provided which may comprise a plurality of voltage converting units, each of them being adapted to output first voltage signals of first phases at first outputs of the voltage converting units. The first phases may be identical to one another. In particular, the plurality of voltage converting units may be identically designed to one another and may be adapted to convert AC voltage signals to DC voltage signals or may be adapted to convert DC voltage signals to AC voltage signals. A plurality of first inter-phase transforming units may be provided, wherein each of the first inter-phase transforming units may be associated with a different one of the voltage converting units in that the first output of each one of the voltage converting units may be electrically connected to a different one out of the plurality of first inter-phase transforming units. Thus, the voltage converting units may be in parallel electrical communication to one another. Each of the first inter-phase transforming units may comprise primary and secondary coils which may be magnetically coupled to one another such that one magnetic circuit may be provided by each of the first inter-phase transforming units. In particular, the primary and secondary coils of the first inter-phase transforming units may be only magnetically coupled to one another. The primary coils of each one of the first transforming units and the secondary coils of each one of the first inter-phase transforming units may be electrically connected to one another such that a cyclic ring configuration of the inter-phase transforming units may be provided. Further, each of the first inter-phase transforming units may be adapted to output a transformed first voltage signal. In particular, the first inter-phase transforming units may be physically arranged in a row or in a series such that one inter-phase transforming unit out of the plurality of the first inter-phase transforming units may comprise two neighbouring inter-phase transforming units out of the plurality of first inter-phase transforming units except the first one and the last one of the first inter-phase transforming units in this series. In particular, each primary or secondary coil of each one of the plurality of first inter-phase transforming units of the series arrangement may be magnetically coupled to the respective secondary or primary coil of the same first inter-phase transforming unit and to a respective secondary or primary coil of a neighbouring one of the plurality of first inter-phase transforming unit except the secondary coil of the first one of the plurality of first inter-phase transforming units in the series and the secondary coil of the last one of the plurality of first inter-phase transforming units in the series. In particular, a rotational direction of windings of the primary coils of the inter-phase transforming units of the plurality first inter-phase transforming units may be clockwise seen in a voltage signal transmission direction, namely in a signal transmission direction of the first voltage signals. In particular, the secondary coils of the inter-phase transforming units of the plurality of first inter-phase transforming units may be oppositely arranged, wherein a rotational direction of windings of the secondary coils of the inter-phase transforming units of the plurality of first inter-phase transforming units may be clockwise seen in a voltage signal transmission direction, namely in a direction of the outputted transformed first voltage signals.

In particular, the first output of each voltage converting unit may be electrically connected to a first input connection of the primary coil of one of the plurality of first inter-phase transforming units. In particular, an output of the primary coil of the one of the plurality of first inter-phase transforming units may be electrically connected to an input connection of a secondary coil of another one of the plurality of first inter-phase transforming units. In particular, an output connection of the secondary coil of one of the plurality of first inter-phase transforming units may be electrically connected to a load, in particular, to a common load of all inter-phase transforming units of the plurality of first inter-phase transforming units.

It should be noted that all of the above described characteristics may be valid for the plurality of second inter-phase transforming units as well.

In particular, each of the transformed voltage signals may arise from electrical signal paths comprising two coils, namely a primary coil of one inter-phase transforming units of the plurality of first inter-phase transforming units and a secondary coil of another inter-phase transforming unit of the plurality of first inter-phase transforming units. Thus, equivalent transformed first voltage signals may be generated, and a subsequent operation on the transformed first voltage signals may be facilitated.

Further, an easy and cost-effective constructive design of the power converting device may arise from the particular embodiment as described, since conventional components in terms of voltage converting units and inter-phase transforming units are combined in a very easy way. In particular, the provision of further voltage converting units and first inter-phase transforming units may give rise to a very modular arrangement of the power converting device in scaling the output power rating. In particular, the arrangement of the sets of inter-phase transforming unit in a module or on a common carrier may be an efficient way to enable a modular scalability of the whole power converting device. For example, additional voltage converting units and respective sets of inter-phase transforming unit may be easily connected to an existing power converting device.

Further, as the number of first voltage signals to be averaged and fed to a common node may change depending on the desired power rating generated at the common load of the power converting device, particularly when the power rating of the intended application increases, then the number of inter-phase transforming units providing the voltage averaging function may have to increase. Thus, adapting the desired power rating, particularly increasing or decreasing of the power rating, may be accomplished in a very easy way. In particular, by just including or deleting of voltage converting units and the respective module of inter-phase transforming units it may be possible to adjust the provided power output.

Next, further exemplary embodiments of the power converting device will be explained. However, these embodiments also apply to the power supply apparatus.

According to an exemplary embodiment the power converting device further comprises a first common node, wherein the secondary coil of each one of the plurality of the first inter-phase transforming units may be electrically connected to the first common node. In particular, the power converting device may comprise a second common node wherein the secondary coil of each one of the plurality of secondary inter-phase transforming units is electrically connected to the second common node. Thus an output voltage signal of a single phase may be generated based on the first voltage signals of identical phases. Further, up- or down scaling of voltage signals inputted to the voltage converting units may be achieved by increasing or decreasing the number of voltage converting units being in parallel electrical communication to one another, respectively.

According to an exemplary embodiment of the power converting device each one of the plurality of N voltage converting units comprises a third output, wherein each voltage converting unit is adapted to output a third voltage signal of a third phase at the third output. Furthermore, the power converting device further comprises a plurality of N third inter-phase transforming units, each comprising a primary coil and a secondary coil which are magnetically coupled, wherein the third output of each of the plurality of N voltage converting units is electrically connected to a primary coil of a different one of the N third inter-phase transforming units. Moreover, the primary coil of each one of the plurality of N third inter-phase transforming units is electrically connected to one secondary coil of another one of the plurality of N third inter-phase transforming units, and each one of the N inter-phase transforming unit sets comprises one of the plurality of N third inter-phase transforming units. In particular, it should be noted that each of the N inter-phase transforming unit sets together with its associated inter-phase transforming unit may be assembled into one manufacturable unit or modular unit.

In particular, the third phase may be different to the first phase and the second phase. For example, a phase shift may be 120° each, i.e. the first phase may have a phase shift to the second one of 120° or −120° while the second phase may have a phase shift of 120° or −120°, respectively.

In particular, the power converting device may be a multiphase power converting device, wherein the power converting device may operate on three or more than three different phases. In particular, the power converting unit may be a two-phases power converting device, wherein the power converting device may be adapted to operate on two phases only. In particular, the first, second, and third inter-phase transforming units, which may be electrically connected to the same voltage converting unit, may be, physically seen, vertically stacked below the particular voltage converting unit such that a basic module may be formed. Thus, arranging such basic modules in series, the basic modules may be arranged adjacent to one another. This particular arrangement of the voltage converting units and the first, second, and third inter-phase transforming units may further improve the easiness of the constructive design of the power converting device. In particular, providing such basic modules, the costs of manufacturing the power converting device may be significantly reduced, since additional equipment being necessary for all of the inter-phase transforming units, e.g. air cooling or liquid cooling interfaces, may be shared in one basic module. In particular, if the rotational direction of the windings of all primary coils and of all secondary coils of the first, second and third inter-phase transforming unit of one basic module are uniform, respectively, the three magnetic circuits provided by the first, second, and third inter-phase transforming unit may be decoupled from one another, thereby achieving the intended electromagnetic characteristics, reducing electrical losses in the signal paths and meanwhile increasing the performance of the power converting device.

According to an exemplary embodiment the power converting device may further comprise second and third common nodes, wherein the secondary coil of each one of the plurality of the second inter-phase transforming units may be electrically connected to the second common node, wherein the secondary coil of each one of the plurality of the third inter-phase transforming units may be electrically connected to the third common node. Thus, two further overall output voltage signals each being of a single but different phase may be generated based on the transformed second and third voltage signals of identical phases, respectively. Further, up- or down scaling of a voltage signal inputted to the voltage converting units may be achieved by increasing and decreasing the number of voltage converting units being in parallel electrical communication to one another.

According to an exemplary embodiment of the power converting device N equals two, three, four, or six. In other words, at least one of the plurality of first inter-phase transforming units, the plurality of second inter-phase transforming units, and the plurality of third inter-phase transforming units may comprise two, particularly four, further particularly six inter-phase transforming units. In particular, the number of voltage converting units and/or the number of inter-phase transforming units of the plurality of first inter-phase transforming units, the plurality of second inter-phase transforming units, and the plurality of third inter-phase transforming units may be equal to one another. Adding further voltage converting units and further first, second, and third inter-phase transforming units allows for upscaling the power rating of a power supply apparatus which comprises such a power converting device.

According to an exemplary embodiment of the power converting device at least one of the electrical connections between primary coils of the first set of inter-phase transforming units and the second set of inter-phase transforming units is formed by a fishplate. In particular, all electrical connections between inter-phase transforming units arranged on or in different modules may be formed by fishplates. For example, the different modules may be connected to each other by such fishplates.

In other words, at least one of a connection between the primary coil of one of the plurality of first inter-phase transforming units and the secondary coil of another one of the plurality of first inter-phase transforming units, a connection between the primary coil of one of the plurality of second inter-phase transforming units and the secondary coil of the another one of the plurality of second inter-phase transforming units, and a connection between the primary coil of one of the plurality of third inter-phase transforming unit and the secondary coil of the another one of the plurality of third inter-phase transforming unit may be formed by a fishplate. In particular, all connection between the first inter-phase transforming units, between the second inter-phase transforming units, and between the third inter-phase transforming units may be formed by a fishplate, respectively.

In particular, fishplates may be used as electrical connection between primary and secondary coils of two different inter-phase transforming units being arranged adjacent to one another or in close proximity to one another.

According to an exemplary embodiment of the power converting device at least one of the electrical connections between primary coils of the first set of inter-phase transforming units and the second set of inter-phase transforming units is formed by a loop-back wire. In particular, all electrical connections between inter-phase transforming units arranged on or in different modules may be formed by loop-back wires. For example, the different modules may be connected to each other by such loop-back wires.

In other words, at least one of a connection between the primary coil of one of the plurality of first inter-phase transforming units and the secondary coil of the another one of the plurality of first inter-phase transforming units, a connection between the primary coil of one of the plurality of second inter-phase transforming units and the secondary coil of the another one of the plurality of second inter-phase transforming units, and a connection between the primary coil of one of the plurality of third inter-phase transforming units and the secondary coil of the another one of the plurality of third inter-phase transforming units may be formed by a loop-back wire.

In particular, a loop-back wire may be a feedback loop based on an electrical wire connection. In particular, all connection between the first inter-phase transforming units, between the second inter-phase transforming units, and between the third inter-phase transforming units may be formed by a loop-back wire, respectively. In particular, loop-back wires may be used as electrical connection between primary and secondary coils of two different inter-phase transforming units being not arranged adjacent to one another or in close proximity to one another.

According to an exemplary embodiment of the power converting device at least one of the primary and secondary coils of one of the first inter-phase transforming units, the primary and secondary coils of one of the second inter-phase transforming units, and the primary and secondary coils of one the third inter-phase transforming units may be identical to one another. In particular, the primary and secondary coils of each one of the plurality of the first inter-phase transforming units may be identical to one another, the primary and secondary coils of each one of the plurality of the second inter-phase transforming units may be identical to one another, and the primary and secondary coils of each one of the plurality of the third inter-phase transforming units may be identical to one another. In particular, each primary and secondary coils of the first, second and third inter-phase transforming units may be identical to one another.

In particular, the number of windings may be identical. For example, the number of windings of the primary coils of each inter-phase transforming unit may be equal. Additionally, the number of windings of the secondary coils of each inter-phase transforming unit may be equal. Alternatively, only the number of windings of the primary coils and/or secondary coils of the plurality of N first inter-phase transforming units, of the plurality of N second inter-phase transforming units and/or of the plurality of N third inter-phase transforming units may be equal.

In other words, the inter-phase transforming units of one set may be equal or identical. In particular, all of the plurality of first inter-phase transforming units, and/or all of the plurality of second inter-phase transforming units, and/or all of the plurality of second inter-phase transforming units may be identical or equal.

In particular, identical primary and secondary coils of at least the first, second and third inter-phase transforming units may cause transformed voltage signals outputted by the first, second and third outputs of the voltage converting units to be fed through two identical coils before being fed to the first, second, and third common node, respectively. Thus, inductance leakages arising in these coils may be identical such that the outputted power rating can be exactly determined.

According to an exemplary embodiment of the power converting device at least one inter-phase transforming unit out of plurality of first, second, and third inter-phase transforming units may comprise a magnetic core member at which the primary and secondary coils may be arranged. In particular, each inter-phase transforming unit of the power converting device may comprise a magnetic core member. For example, the first, second, and third inter-phase transforming units may be identically designed. Furthermore, each inter-phase transforming unit of at least one set inter-phase transforming units may comprise a magnetic core member. Alternatively, only inter-phase transforming units of the first plurality of inter-phase transforming units, only inter-phase transforming units of the second plurality of inter-phase transforming units, and/or only inter-phase transforming units of the third plurality of inter-phase transforming units may comprise a magnetic core member.

In particular, such a magnetic core member may be designed as a rectangular iron element at which opposite legs the primary and secondary coils are arranged. Using a magnetic core member may enhance the magnetic flux between adjacent magnetically coupled coils such that the performance of the inter-phase transforming units may be increased.

Next, further exemplary embodiments of the power supply apparatus will be explained. However, these embodiments also apply to the power converting device.

The power generating device may be a wind turbine. Alternatively, the power generating device may be a solar cell or a plurality of solar cells. Thus, the power converting device according to an exemplary aspect of the invention may be implemented in any type of power supply apparatus to be connectable to a power supply network.

According to another exemplary aspect of the invention, a power converting device and a power supply apparatus comprising such a power converting device may be provided. In particular, modularity arrangements for an interbridge transformer (IBT) may be provided to achieve the benefits of increasing effective switching frequency of multi-parallel inverters or converters without increasing the actual switching frequency. In particular, the power converting device and the power supply apparatus may achieve standardisation and modularisation of the IBT assembly for various numbers of multi-parallel inverters.

It may be known that in the application for wind turbines of various ratings, a 1 IBT design may be used, in differing numbers, for all power ratings in the wind turbine product power range. The IBT arrangement may provide an output voltage which may be the average of output voltage of all inverter phases brought into parallel operation by the IBT connection. Suitable phase shifting of the harmonic output of the individual inverter phases may lead to the resulting harmonic frequencies seen at the commoning node (that connected to the load) being free of at least the first harmonic components of the switching frequency of each inverter. Taking an example with 4 inverter modules each with a switching frequency of 2.5 kHz with the respective PWM (phase width modulation) signals suitably phase shifted from each other and connected together in an array with 1BTs as described here may result in harmonics at the output node relating to 10 kHz, so achieving cancellation of 2.5 kHz, 5 kHz and 7.5 kHz related harmonics at the communing node.

The organisation of the IBT's or the power converting device is such that each 3-phase IBT assembly may be associated directly with each three-phase inverter module. More three-phase inverter modules may result directly in more IBT assemblies, all of which may be identical, thus allowing incremental power ratings at the system level. Each 3-phase inverter in the array may be identical as it may be each 3-phase IBT assembly in the array. Up-scaling the power rating of the complete inverter/IBT array may be a matter of adding another (or more) identical sections. This may have particular advantage when a range of power ratings may be required at the system level. From a system wiring point of view, the IBT may incorporate the conductor that completes the loop-back (ring) where the current from the last IBT in the array may be brought back to the first IBT. Then interconnections between all IBTs in the array may be achieved with simple fishplates.

In particular, modularity and standardisation of an IBT assembly for all power ratings to which such an arrangement may be applied. This then may offer benefits in production logistics and economies of scale in the production of the IBTs themselves as only one version is being produced.

The three separate functional IBTs being needed to map to the three separate phases of the associated inverter module may be brought together into one manufactured assembly. Although the magnetic circuit of each IBT remains separate—as it may have to do to achieve the intended electromagnetic characteristics—other requirements such as liquid cooling interfaces or air cooling provisions may be shared between all three IBTs, so reducing the overall cost of the assembly and still having the benefits of modularity and standardisation of IBT for all power ratings to which the arrangement may be applied.

The demands for the applied ring formation of the IBT's may be the following: Each inverter phase may be compared with only two other output phases independently of the total number of inverters in the entire array. Further, each inverter phase may be connected to the output node by only two coils independently of the total number of inverters in the entire array. This may ensure that the same leakage (common mode) inductances may be present for each phase. Yet further, all IBT's may be identical and their terminals and dot notation particularly in terms wining rotations of the primary and secondary coils may be setup to accommodate the ring configuration. Yet further, the ring configuration may need to support an arbitrary number of IBT assemblies which may be defined later.

Each IBT may have to be set up to accommodate the ring configuration. The following mechanical terminal setup may ensure this. This setup may of course be mirrored in both the X and Y axis, if this accommodates the inverter module configuration, as long as the dot conventions may be changed accordingly. This may be different to a more conventional IBT arrangement whereby the coil winding directions would be diagonally opposite—to keep the winding arrangement (rotation) consistent between left and right hand hand limbs.

One IBT comprises four terminals "a", "b", "c" and "d". The terminal "a" may be a "Phase OUT" terminal, thus this terminal being the output of one phase to the common phase node. The terminal "b" may be a "Phase IN", thus this terminal connecting to the inverter. The terminal "c" may be a "From Previous IBT" terminal, thus this terminal necessarily being aligned with the previous "To Next IBT" terminal of the previous IBT. The terminal "d" may be a "To Next IBT" terminal, thus this terminal necessarily being to be aligned with the "From Previous IBT" terminal of the next IBT.

The advantage of setting up the IBT terminals as explained above may be, that the next set of IBTs from the next inverter of the ring configuration may "click" into the first one because of the configuration of terminal "b" and "d". Also, each inverter phase may be connected to the output node through 2 coils, regardless of the number of inverters, because terminal "a" and "b" may be electrically connected.

One IBT assembly may be defined as three single IBT's stacked on top of each other, each connecting one phase (U, V, W) of the corresponding inverter to the next IBT assembly. Fishplate connections may be included in this setup. These may represent the interconnections between the individual IBT assemblies forming the ring configuration. Now, as the rules for connection and the IBT assembly may have been defined, the ring configuration may fulfill the requirements.

To form a linear array of inverter and IBT modules and still achieve the ring configuration from an electrical viewpoint, the particular arrangement of power converting unit as described may be proposed.

The end connection or loop-back wire may also illustrate that an arbitrary number of IBT assemblies and inverters may be added without breaking the ring configuration, as long as the last IBT loops back to the first IBT. The three-phase IBT assembly may comprise first, second, and third inter-phase transforming units each of which being connected to the first, second, and third output of the same inverter.

Multiple instances, in particular 4, of identical three-phase IBT assemblies may be necessary to realize the full array. Concluding, a ring cycle consisting of multiple IBT assemblies may be proposed. The proposed ring cycle may enable the parallel connection of $N \geq 3$ inverters, as there may be no purpose in the cyclic cascade arrangement for only 1 or 2 inverters, although it may not be prohibited. The layout of the proposed ring configuration may ensure that, firstly, each phase may be connected magnetically to two other phases, secondly, each inverter may connect to the output node through two coils (hence the same leakage inductance may be present for all inverter outputs), thirdly, all the IBT's may have the same basic layout as described above, and, fourthly, three or more IBT assemblies may be connected after the principles as described above.

Summarizing an exemplary aspect may be seen in providing a power converting unit which comprises a plurality of voltage converting units, e.g. at least three, each comprising a plurality of outputs, e.g. three, each adapted to output voltage signals and each coupled to a first connection of a primary coil of an inter-bridge transformer magnetically coupled to the secondary coil of the same inter-bridge transformer wherein the output of the first coil is connected to the second connection of the successive inter-bridge transformer wherein the first connection of the second coil is connected to the final output node wherein the successive inter-bridge transformer is the first inter-bridge transformer for the last inter-bridge transformer in the arrangement wherein the assembly of a plurality of inter-bridge transformers relating to each voltage converting unit is combined into one manufacturable unit. Such an arrangement of inter-bridge transformers may be also called a ring configuration or cyclic cascade of inter-bridge transformers. A person skilled in the art may get additional information concerning the basic concept of a cyclic cascade from "Modeling and Analysis of Multi-Interphase Transformers for Connecting Power Converters in Parallel" from In Gyu Park et al., IEEE 0.7803-3840-5/97.

BRIEF DESCRIPTION OF THE DRAWINGS

The aspects defined above and further aspects of the present invention are apparent from the examples of embodiments to be described hereinafter and are explained with reference to the examples of embodiment. The invention will be described in more detail hereinafter with reference to examples of embodiment but to which the invention is not limited.

DETAILED DESCRIPTION OF INVENTION

The illustration in the drawings is schematically. It is noted that in different figures, similar or identical elements are provided with the same reference signs or with reference signs, which are different from the corresponding reference signs only within the first digits.

In general, a power converting device comprises N voltage converting units and N sets of inter-phase transforming units, each of them comprising first, second, and third inter-phase transforming units. Each of the N voltage converting units comprises first, second, and third outputs. Each of the first, second, and third inter-phase transforming units comprises primary and secondary coils which are magnetically coupled to one another.

The first outputs of the N voltage converting units are electrically connected to different primary coils the N first inter-phase transforming units. Similarly, the second outputs of the N voltage converting units are electrically connected to different primary coils the N second inter-phase transforming units, and the third outputs of the N voltage converting units are electrically connected to different primary coils the N third inter-phase transforming units. Each of the primary coils of the N first, N second, and N third inter-phase transforming units are electrically connected to secondary coils of a different one of the N first, N second, and N third inter-phase transforming units, respectively. Each of the secondary coils of the N first, N second, and N third inter-phase transforming units are electrically connected to first, second, and third common nodes, respectively.

In operation of the power converting device, each of the N voltage converting units outputs first, second, and third voltage signals with first phases of the first voltage signals, second phases of second voltage signals, and third phases of third voltage signals being different to one another. However, the first phases of the first voltage signals, the second phases of the second voltage signals, and the third phases of the third voltage signals may be identical to one another, respectively. The N first, N second, and N third voltage signals are fed to the associated first, second, and third inter-phase transforming units such that each of the first inter-phase transforming units, the second inter-phase transforming units, and the third inter-phase transforming units generate a transformed first voltage signal, a transformed second voltage signal, and a transformed third voltage signal, respectively, wherein the transformed first voltage signals are combined at the first common node, the transformed second voltage signals are combined at the second common node, and the transformed third voltage signals are combined at the third common node.

In the following, a power converting device for N=4 will be explained.

Figure 1:
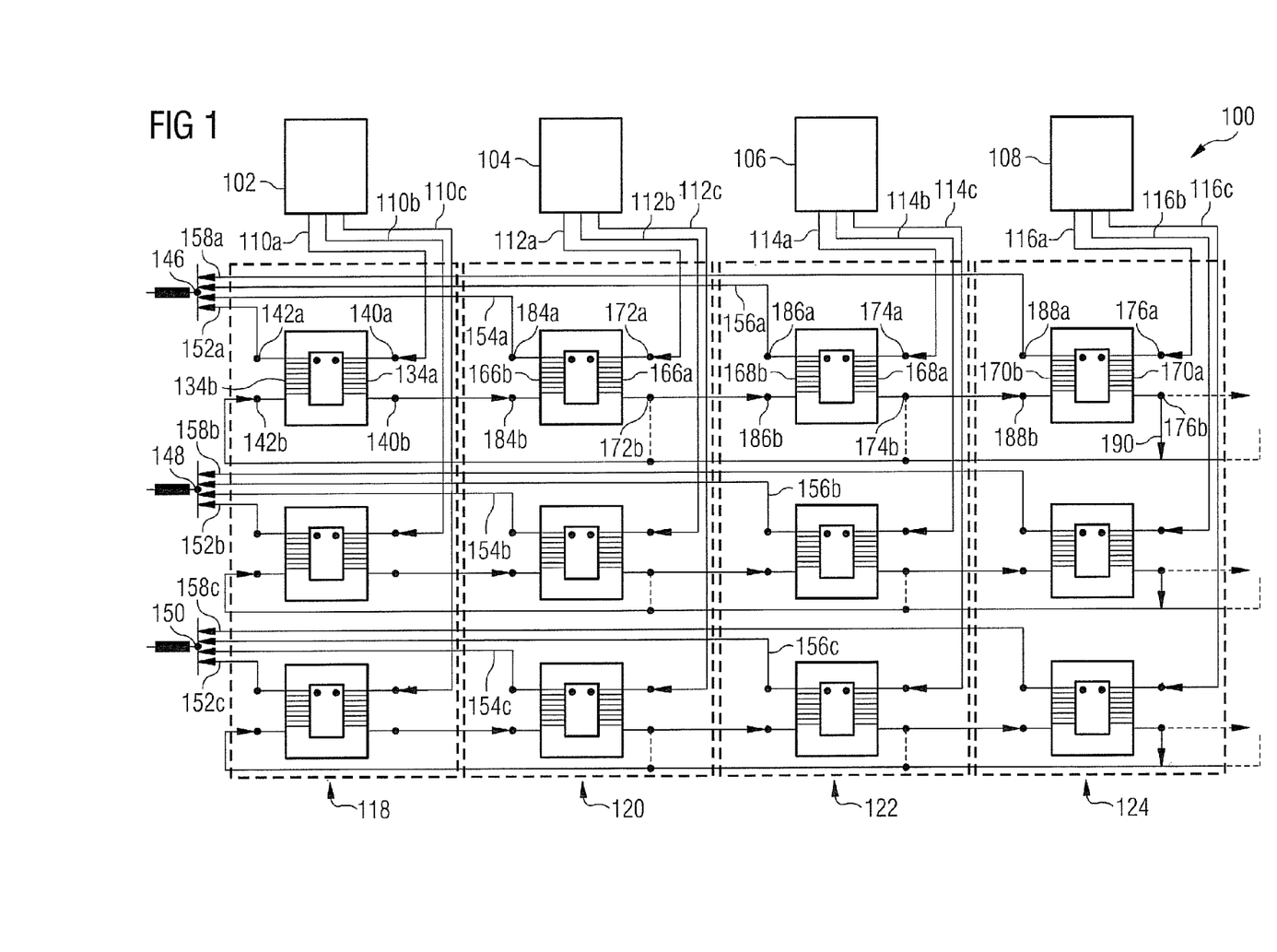
FIG. 1 shows a schematic view of a power converting device according to an exemplary embodiment of the invention.

FIG. 1 shows a multiphase power converting device 100 which comprises four voltage converting units 102-108 which are adapted to convert incoming AC voltage signals (not shown) to first, second and third voltage signals 110*a-c*, 112*a-c*, 114*a-c*, 116*a-c* of first, second, and third phases. For illustration purposes, electrical signal paths are indicated as the first, second, and third voltage signals 110*a-c*, 112*a-c*, 114*a-c*, 116*a-c*. The first voltage signal 110*a* comprises a first phase, which is different from a second phase of the second voltage signal 110*b* and the third phase of the third voltage signal 110*c*. Further, the first phases of the first voltage signals 110*a*, 112*a*, 114*a*, 116*a*, the second phases of the second voltage signals 110*b*, 112*b*, 114*b*, 116*b*, and the third phases of the third voltage signals 110*c*, 112*c*, 114*c*, 116*c* may be identical to one another, respectively.

The multiphase power converting device 100 further comprises four sets 118-124 of inter-phase transforming units. Each set 118-124 of inter-phase transforming units is associated to and electrically connected to a different one of the voltage converting units 102-108. The sets 118-124 of inter-phase transforming units are arranged in series. All transforming units of the first, second, third, and fourth set 118-124 of inter-phase transforming units may be identically designed.

Figure 2A:
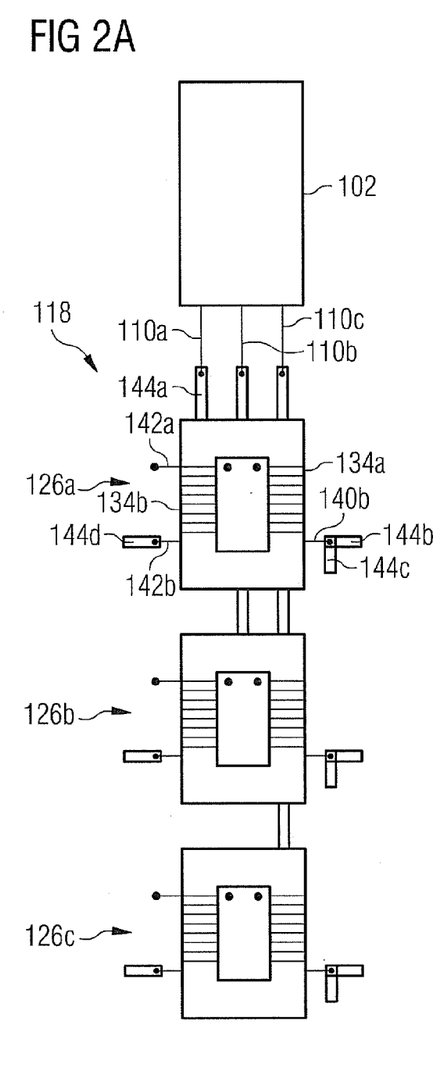
FIG. 2a shows a partial front view of the power converting device in FIG. 1.
Figure 2B:
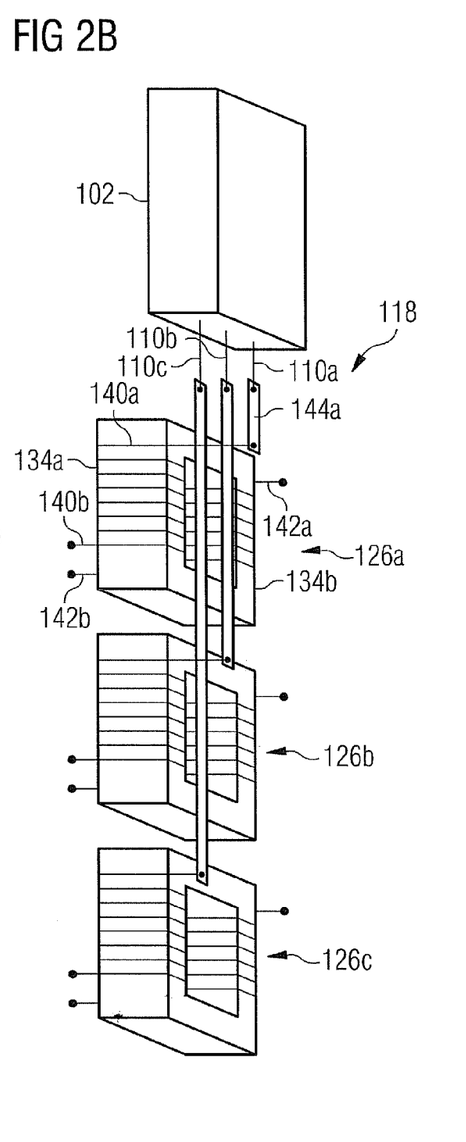
FIG. 2b shows a partial side view of the power converting device in FIG. 1.

Referring to FIG. 2a, 2b front and perspective rear side views of the first voltage converting unit 102 and the first set 118 of inter-phase transforming units are shown in more detail. The first set 118 of inter-phase transforming units comprises first, second, and third inter-phase transforming units 126*a-c* which are vertically stacked. However, the first, second, and third inter-phase transforming units 126*a-c* can be arranged in any other possible configuration.

Figure 3:
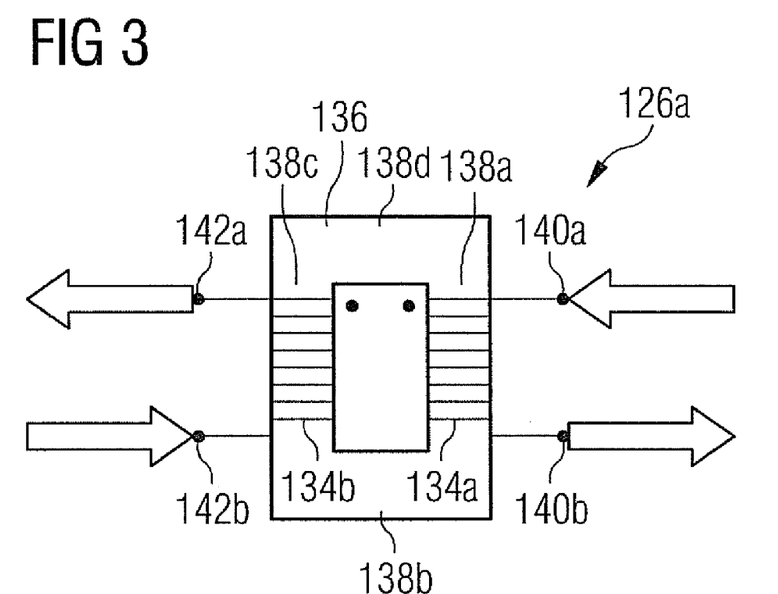
FIG. 3 shows a first inter-phase transforming unit of the power converting device in FIG. 1.

In the following, referring to FIG. 3, the first inter-phase transforming unit 126*a* of the first set 118 of inter-phase transforming units associated to the first voltage converting unit 102 will be explained.

The inter-phase transforming unit 126*a* comprises first primary and secondary coils 134*a, b* and a magnetic core member 136. The magnetic core member 136 is designed as a rectangular iron element comprising two sets of oppositely arranged legs 138*a-d*. The first primary coil 134*a* is arranged at the leg 138*a* of the magnetic core member 136, and the first secondary coil 134*b* is arranged at the opposite leg 138*c* of the magnetic core member 136. The primary coil 134*a* and the secondary coil 134*b* are designed in a spiral-like way and comprise rectangular windings. A first ending portion 140*a* of the primary coil 134*a* represents an input port for the first voltage signal 110*a*. A second ending portion 140*b* of the primary coil 134*a* represents a connecting terminal for an electrical connection to a secondary coil of a further first inter-phase transforming unit, namely to the secondary coil of the first inter-phase transforming unit 128*a* of the second set 120 of inter-phase transforming units. Similarly, a first ending portion 142*a* of the secondary coil 134*b* represents an output port for a transformed first voltage signal. A second ending portion 142*b* of the secondary coil 134*b* represents a connecting terminal for an electrical connection to a primary coil of a further first inter-phase transforming unit, namely to the primary coil of the first inter-phase transforming unit 132*a* of the fourth set 124 of inter-phase transforming units. Seen in a signal transmission direction of the first voltage signal 110*a* being fed to the first ending portion 140*a* of the primary coil 134*a*, the primary coil 134*a* is wounded in a clockwise direction. Seen in a signal transmission direction of the transformed first voltage signal being fed away via the first ending portion 142*a* of the secondary coil 134*b*, the secondary coil 134*b* is also wounded in a clockwise direction.

Again referring to FIG. 2b, the first, second, and third transforming units 126a, b, c are arranged in that they are horizontally with respect to the voltage converting unit 102 for wiring purposes. The ending portions 140a, b, 142a, b of the primary and secondary coils 134a, b are connected to fishplates 144a-d of suitable sizes. Further, the first ending portion 140a and the first ending portion 142a of the primary and secondary coils 134a, b are bound to be arranged at the similar side of the magnetic core member 136. Further, the second ending portion 140b and the second ending portion 142b of the first primary and secondary coils 134a, b are bound to be arranged on the similar side of the magnetic core member 136, but different sides of the magnetic core member 136 compared to the first ending portions 140a, 142a.

As shown in FIG. 1, the output ports of the first transforming units 126a, 128a, 130a, 132a of the first, second, third, and fourth set 118-124 of inter-phase transforming units, namely the first ending portions 142a, 184a, 186a, 188a of the secondary coils 134b, 166b, 168b, 170b, are connected to a first common node 146. Similarly, the output ports of the second inter-phase transforming units 126b, 128b, 130b, 132b of the first, second, third, and fourth set 118-124 of inter-phase transforming units are connected to a second common node 148. Output ports of the third inter-phase transforming units 126c, 128c, 130c, 132c of the first, second, third, and fourth set 118-124 of inter-phase transforming units are connected to a third common node 150. The first, second, and third common nodes 146-150 combine transformed voltage signals 152a-c, 154a-c, 156a-c, 158a-c of similar phases such that three single-phased output voltage signals (not shown) of three different phases are generated.

The first inter-phase transforming units 126a, 128a, 130a, 132a, the second inter-phase transforming units 126b, 128b, 130b, 132b, and the third inter-phase transforming units 126c, 128c, 130c, 132c of the first, second, third, and fourth set 118-124 of inter-phase transforming units are connected to one another in a cyclic ring configuration, respectively. Thus, the first primary coil 134a of the first inter-phase transforming unit 126a of the first set 118 of inter-phase transforming units is connected to the secondary coil 166b of the first inter-phase transforming unit 128a of the second set 120 of inter-phase transforming units in that the second ending portion 140b of the primary coil 134a is connected to the second ending portion 184b of the secondary coil 166b. Further, the primary coil 166a of the first inter-phase transforming unit 128a of the second set 120 of inter-phase transforming units is connected to the secondary coil 168b of the first inter-phase transforming unit 130a of the third set 122 of inter-phase transforming units in that the second ending portion 172b of the primary coil 166a is connected to the second ending portion 186b of the secondary coil 168b. Further, the primary coil 168a of the first inter-phase transforming unit 130a of the third set 122 of inter-phase transforming units is connected to the secondary coil 170b of the first inter-phase transforming unit 132a of the fourth set 124 of inter-phase transforming units in that the second ending portion 174b of the primary coil 168a is connected to the second ending portion 188b of the secondary coil 170b. As mentioned above, theses connections are accomplished by connecting the corresponding ending portions of the coils to the fishplates.

Further, the primary coil 170a of the first inter-phase transforming unit 132a of the fourth set 124 of inter-phase transforming units is connected to the secondary coil 134b of the first inter-phase transforming unit 126a of the first set 118 of inter-phase transforming units in that the second ending portion 176b of the primary coil 170a is connected to the second ending portion 142b of the second ending portion 142b of the secondary coil 134b via a loop-back wire 190. The loop-back wire 190 may not be directly connected to the ending portions 176b, 142b of the coils 170a, 134b, but to fishplates interposed between the respective wire endings.

The second inter-phase transforming units 126b, 128b, 130b, 132b and the third inter-phase transforming units 126c, 128c, 130c, 132c are similarly coupled to one another, respectively, as described above from a wiring point of view.

In operation of the multiphase converting device 100, first, second, and third voltage signals 110a-c, 112a-c, 114a-c, 116a-c are fed to the first, second, third, and fourth primary coils 134a, 166a, 168a, 170a of the first, second, and third inter-phase transforming units 126a-c, 128a-c, 130a-c, 132a-c. Using magnetic induction transformed voltage signals 152a-c, 154a-c, 156a-c, 158a-c are generated and are fed to the first, second, and third common nodes 146-150 for subsequent combination to an output voltage signal.

Figure 4:
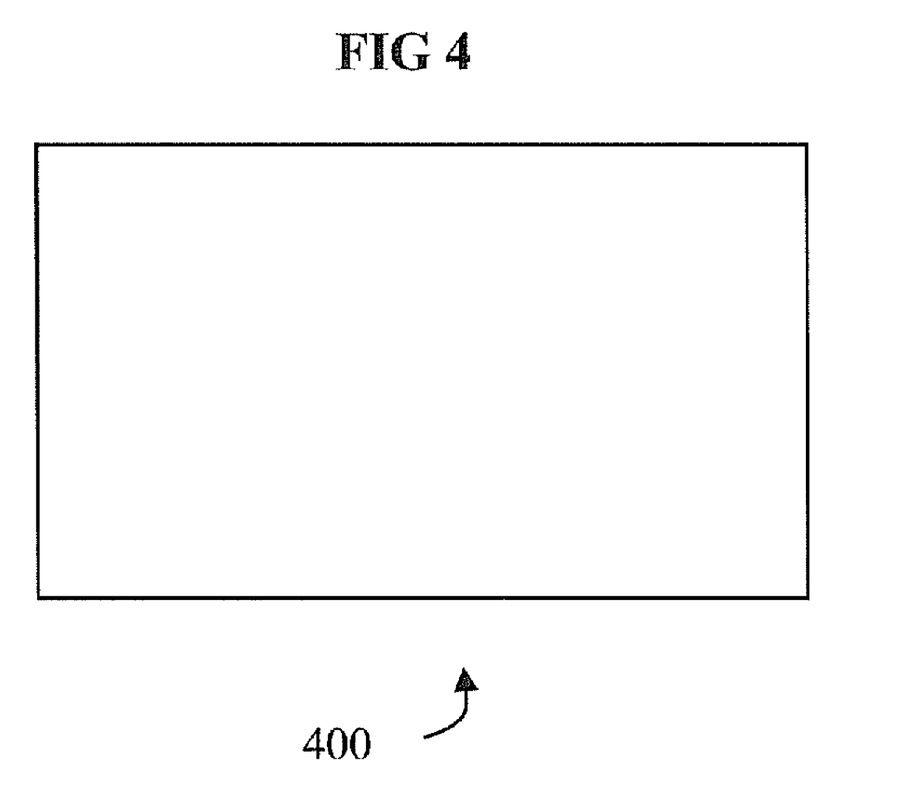
FIG. 4 illustrates a power generating device.

The power generating device 400 may be a wind turbine. Alternatively, the power generating device may be a solar cell or a plurality of solar cells. Thus, the power converting device according to an exemplary aspect of the invention may be implemented in any type of power supply apparatus to be connectable to a power supply network.

Finally, it should be noted that the above-mentioned embodiments illustrate rather then limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A power converting device, comprising:
a plurality of N voltage converting units each comprising a first output and a second output, each voltage converting unit outputs a first voltage signal of a first phase at the first output, and a second voltage signal of a second phase at the second output;
a plurality of N first inter-phase transforming units, each comprising a primary coil and a secondary coil which are magnetically coupled, the first output of each one of the plurality of the N voltage converting units is connected to a primary coil of a different one of the plurality of the N first inter-phase transforming units, the primary coil of each one of the plurality of the N first inter-phase transforming units is electrically connected to one secondary coil of another one of the plurality of the N first inter-phase transforming units; and
a plurality of N second inter-phase transforming units, each comprising a primary coil and a secondary coil which are magnetically coupled, the second output of each one of the plurality of the N voltage converting units is connected to a primary coil of a different one of the plurality of the N second inter-phase transforming units, the primary coil of each one of the plurality of the N second inter-phase transforming units is electrically connected to one secondary coil of another one of the plurality of the N second inter-phase transforming units, wherein the plurality of N first inter-phase transforming units and the plurality of the N second inter-phase transforming units are grouped in N sets of inter phase transforming units, each one of the N sets of inter phase transforming units comprising one of the first inter-phase transforming units and one of the second inter-phase transforming units, and wherein each of the N sets of inter-phase transforming units are combined in one modular unit.

2. The power converting device of claim 1, further comprising:
a first common node,
wherein the secondary coil of each one of the plurality of the N first inter-phase transforming units is electrically connected to the first common node.

3. The power converting device of claim 1, further comprising:
a plurality of N third inter-phase transforming units, each comprising a primary coil and a secondary coil which are magnetically coupled,
wherein each one of the plurality of the N voltage converting units comprises a third output,
wherein each voltage converting unit outputs a third voltage signal of a third phase at the third output,
wherein the third output of each of the plurality of the N voltage converting units is electrically connected to a primary coil of a different one of the third inter-phase transforming units,
wherein the primary coil of each one of the plurality of the N inter-phase transforming units is electrically connected to one secondary coil of another one of the plurality of the N third inter-phase transforming units, and
wherein each one of the inter-phase transforming unit sets comprises one of the plurality of the N third inter-phase transforming units.

4. The power converting device of claim 3, further comprising
a second common node; and
a third common node,
wherein the secondary coil of each one of the plurality of the second inter-phase transforming units is electrically connected to the second common node, and
wherein the secondary coil of each one of the plurality of the third inter-phase transforming units is electrically connected to the third common node.

5. The power converting device of claim 1, wherein N equals two, three, four, or six.

6. The power converting device of claim 1, wherein at least one of the electrical connections between primary coils of the first set of inter-phase transforming units and the second set of inter-phase transforming units is formed by a fishplate.

7. The power converting device of claim 1, wherein at least one of the electrical connections between primary coils of the first set of inter-phase transforming units and the second set of inter-phase transforming units is formed by a loop-back wire.

8. The power converting device of claim 1, wherein at least one of the primary and secondary coils of one of the plurality of the N first inter-phase transforming units, the primary and secondary coils of one of the plurality of the N second inter-phase transforming units, and the primary and secondary coils of one of the plurality of the N third inter-phase transforming units are identical to one another.

9. The power converting device of claim 1, wherein at least one inter-phase transforming unit out of the plurality of the N first, the N second, and the N third inter-phase transforming units comprises a magnetic core member at which the respective primary and secondary coils are arranged.

10. The power converting device of claim 1, wherein at least one of the N sets of inter-phase transforming units is arranged in a common housing.

11. A power supply apparatus connectable to a power supply network, the power supply apparatus comprising:
a power generating device for generating a voltage signal; and
a power converting device, comprising:
a plurality of N voltage converting units each comprising a first output and a second output, each voltage converting unit outputs a first voltage signal of a first phase at the first output, and a second voltage signal of a second phase at the second output,
a plurality of N first inter-phase transforming units, each comprising a primary coil and a secondary coil which are magnetically coupled, the first output of each one of the plurality of the N voltage converting units is connected to a primary coil of a different one of the plurality of the N first inter-phase transforming units, wherein the primary coil of each one of the plurality of the N first inter-phase transforming units is electrically connected to one secondary coil of another one of the plurality of the N first inter-phase transforming units,
a plurality of N second inter-phase transforming units, each comprising a primary coil and a secondary coil which are magnetically coupled, the second output of each one of the plurality of the N voltage converting units is connected to a primary coil of a different one of the plurality of the N second inter-phase transforming units, the primary coil of each one of the plurality of the N second inter-phase transforming units is electrically connected to one secondary coil of another one of the plurality of the N second inter-phase transforming units,
wherein the plurality of N first inter-phase transforming units and the plurality of the N second inter-phase transforming units are grouped in N sets of inter phase transforming units, each one of the N sets of inter phase transforming units comprising one of the first inter-phase transforming units and one of the second inter-phase transforming units, and
wherein each of the N sets of inter-phase transforming units are combined in one modular unit.

12. The power supply apparatus claim 11, the power converting device further comprising:
a first common node,
wherein the secondary coil of each one of the plurality of the N first inter-phase transforming units is electrically connected to the first common node.

13. The power supply apparatus claim 12, the power converting device further comprising:
a plurality of N third inter-phase transforming units, each comprising a primary coil and a secondary coil which are magnetically coupled,
wherein each one of the plurality of the N voltage converting units comprises a third output,
wherein each voltage converting unit outputs a third voltage signal of a third phase at the third output,
wherein the third output of each of the plurality of the N voltage converting units is electrically connected to a primary coil of a different one of the third inter-phase transforming units,
wherein the primary coil of each one of the plurality of the N inter-phase transforming units is electrically connected to one secondary coil of another one of the plurality of the N third inter-phase transforming units, and wherein each one of the inter-phase transforming unit sets comprises one of the plurality of the N third inter-phase transforming units.

14. The power supply apparatus claim 11, the power converting device further comprising:
a second common node; and
a third common node,
wherein the secondary coil of each one of the plurality of the second inter-phase transforming units is electrically connected to the second common node, and
wherein the secondary coil of each one of the plurality of the third inter-phase transforming units is electrically connected to the third common node.

15. The power supply apparatus claim 11, wherein N equals two, three, four, or six.

16. The power supply apparatus claim 11, wherein the power generating device is a wind turbine.

* * * * *